United States Patent [19]

Simpson

[11] 4,102,622
[45] Jul. 25, 1978

[54] MACHINE FOR MAKING A PLANTER

[76] Inventor: Thomas Melvin Simpson, 10024 16 Ave. SW., Seattle, Wash. 98106

[21] Appl. No.: 715,717

[22] Filed: Aug. 19, 1976

[51] Int. Cl.² .......................... B28B 1/29; B29C 23/00
[52] U.S. Cl. ...................................... 425/268; 425/459
[58] Field of Search ............... 425/263, 262, 268, 265, 425/457, 459; 144/1 C, 46

[56] References Cited

U.S. PATENT DOCUMENTS

| 192,823 | 7/1877 | Gracey | 425/268 X |
| 1,750,762 | 3/1930 | Miller | 425/268 X |
| 2,117,695 | 5/1938 | Bovard | 425/268 |
| 2,599,910 | 6/1952 | Guthrie | 425/268 X |
| 2,999,519 | 9/1961 | Peterson | 144/46 X |

Primary Examiner—Francis S. Husar
Assistant Examiner—John S. Brown
Attorney, Agent, or Firm—Morris A. Case

[57] ABSTRACT

A planter with an open mesh wire embedded in an aggregate that is shaped with a smaller diameter at the lip, and the outside surface of the planter is covered with small rocks that extend out from the aggregate. In another version the planter has an open ended plastic container covered with an aggregate having a wire mesh embedded in the aggregate.

A planter is formed on a machine geared to slowly rotate a platform and arbor for holding parts making up the planter while the outside dimension of the planter is being formed against a shaper positioned to remove excess aggregate and to shape the planter.

6 Claims, 10 Drawing Figures

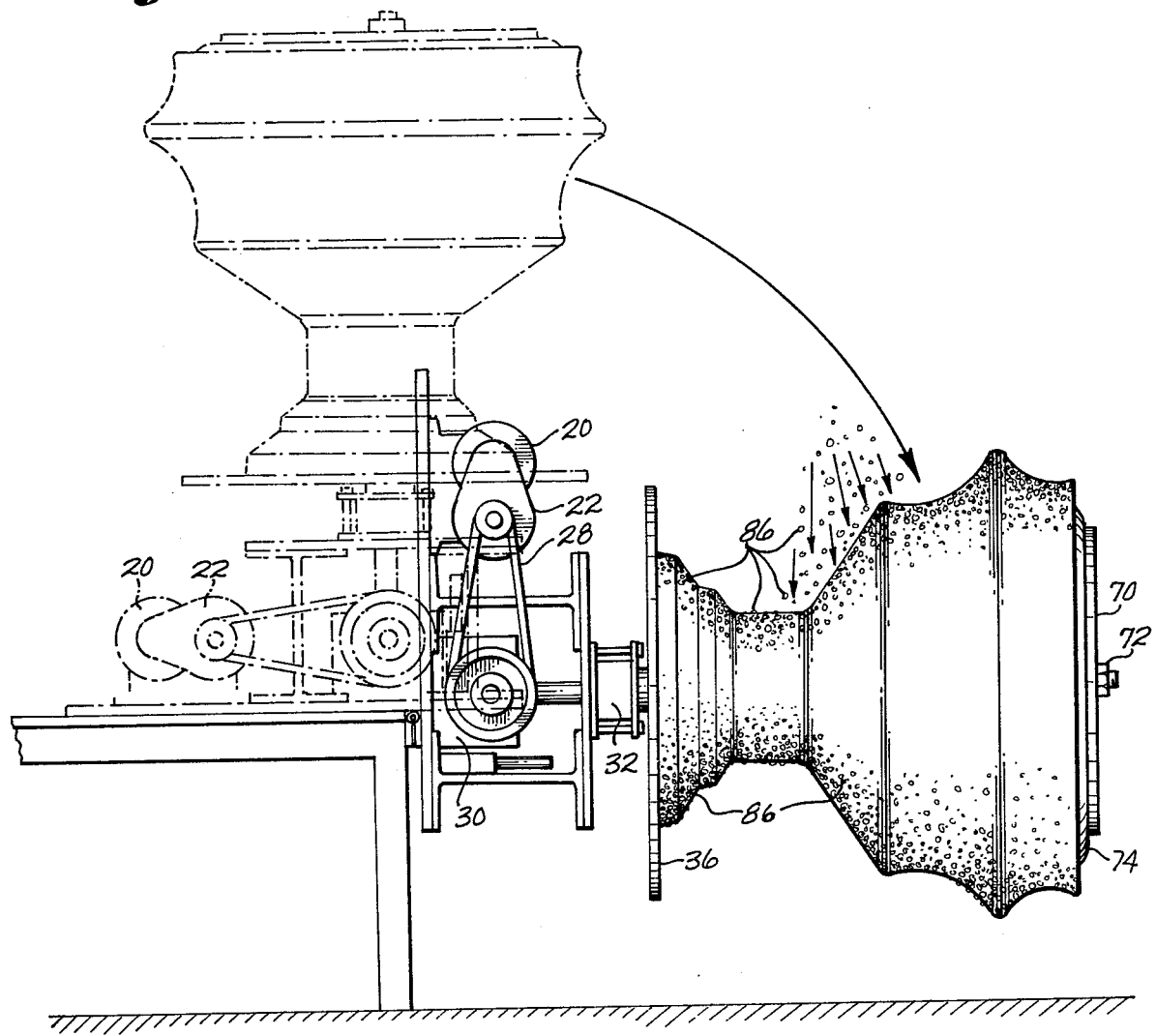
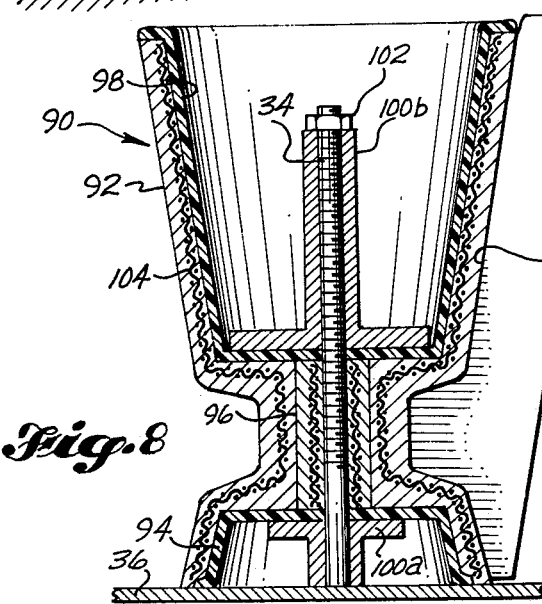
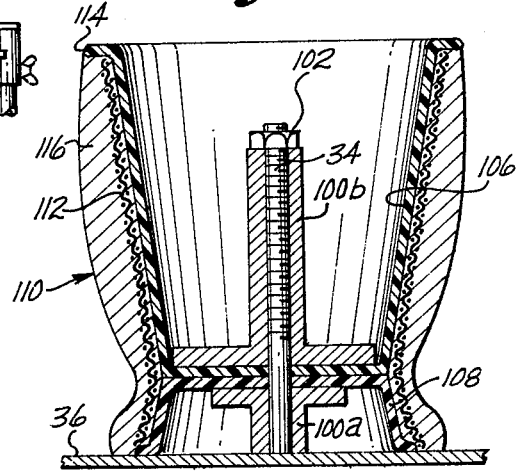

MACHINE FOR MAKING A PLANTER

BACKGROUND OF THE INVENTION

Small vases used as a planter are often made by forming clay on a potters wheel and kiln drying the formed vase to make a planter. These planters can be formed into a variable contour, but have the disadvantage of usually being limited in size and are easily broken. Other planters are made using an aggregate in a plastic or mortar condition, placing the mortar in a mold and allowing the aggregate to set up or cure. When a planter is made in a mold the planter is shaped with a large mouth to permit removal from the mold. The outer surface of the planter may be covered with rock, however, the rocks press down into the aggregate and do not give the pleasing appearance that one obtains when a large amount of the area of the rock is uncovered. In U.S. Pat. No. 2,890,492 to Smith an outside surface covered with rocks is produced on a flat surface by using a cementitious material mixed with rock. This is vibrated to closely pack the rock, then more material is used to fill the mold. The surface against which the rock concentrates is prepared so that the cementitious material adheres to it in place of using a parting agent as one normally uses with a mold. When the surface is struck to be removed much of the cementitious material adhers to it and separation takes place along a plane to leave about half of the area of the rock extending outward to give a pleasing appearance. It was discovered that a tough variable contoured planter with an outer surface of rocks extending mostly outside an aggregate may be obtained.

SUMMARY OF THE INVENTION

Planters shaped like a vase or an urn or various shapes in between are formed by the method of this invention. A machine mounted to a carriage is used which rotates a platform having an arbor, shaft or mandrel extending normal to the platform. The platform with arbor is rotated about the arbor at a speed of a few revolutions per minute. The arbor is equipped to permit fastening at several varied locations along its length. A tool or shaper which does not rotate is adjustably mounted with respect to the arbor. The carriage is pivotally mounted to permit operation with the arbor in the vertical or the horizontal position.

To form a planter an interior part of the planter is placed on the platform and fastened to the arbor or mandrel. An open mesh wire is placed around the interior part, the unit rotated, aggregate in a mortar or mud condition placed against the outside surfaces, and the shaper will remove the excess to form and smooth the contoured outer surface. The aggregate is allowed to partially cure or set-up, the shaper removed, the unit placed with the arbor in a horizontal position and a plurality of small rocks thrown or otherwise impelled against the partially cured aggregate to embed or adhere to the aggregate with a large part of the area of the rocks extending outside the aggregate. The interior part of the planter are molds that are left in the final product or are removed after formation of the planter. A plastic container acting as an interior mold is left in the planter. The interior part of an urn type planter includes a foot or pedestal section or member, a collar sleeve or neck section or member, and a bowl member. An inflated inner tube fastened to the arbor or mandrel on top of the bowl section permits formation of a lip on the planter having a diameter smaller than the adjacent diameter.

It is an object of this invention to provide a variable contoured outside circular cross sectioned planter with prominently projecting small rocks around the exterior.

It is another object of this invention to provide a reinforced planter with a reduced diameter at the lip of the planter.

It is another object of this invention to provide a machine for forming variable contoured planters covered with small prominently projecting rocks.

It is yet another object of this invention to provide a process for forming, reinforced contoured planters covered with prominently projecting small rocks.

DESCRIPTION OF THE DRAWINGS

FIG. 7 shows a fragmented side elevational view of the formed planter of FIG. 6 in a horizontal position and rock being impelled onto the sides of the planter. The machine and planter is also shown in phantom in the vertical position in the same view.

FIG. 8 is a fragmented side elevation sectional view of a different embodiment of a planter being shaped.

FIG. 9 shows a mounted fragmented side elevation sectional view of another embodiment os a shaped planter.

DETAILED DESCRIPTION

Figure 1:
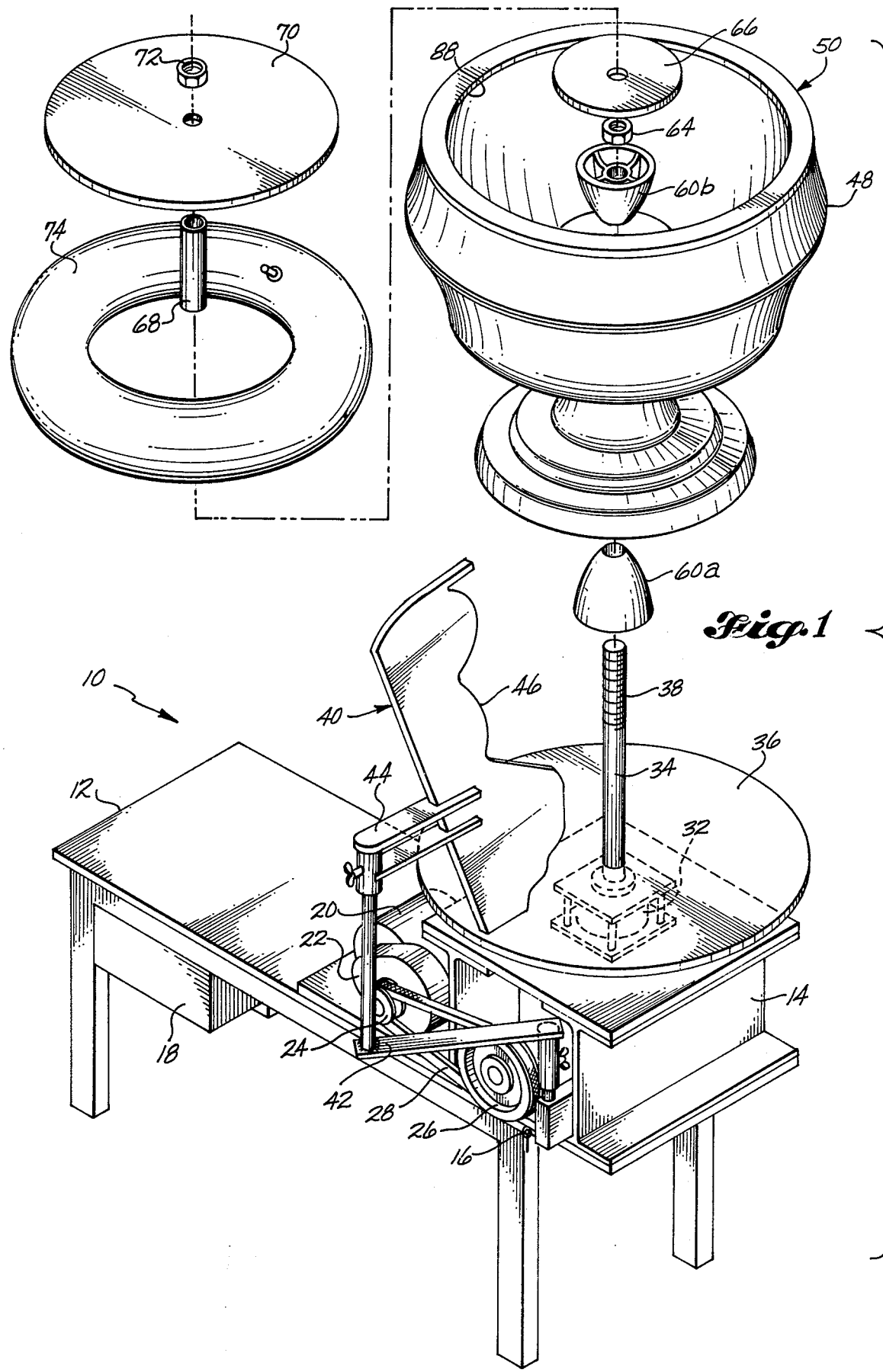
FIG. 1 shows an exploded perspective view of the machine and a planter of this invention.

Machine 10 has a base 12 for supporting a machine. Located on the base is a carriage 14 which is pivotally mounted to the base with hinge 16. Most of the weight on the carriage is located so that the carriage rests flat on the base. The base has weights at 18 to act as a counterbalance when the carriage is pivoted from the vertical to the horizontal position, however, the base could be bolted to the floor to accomplish the same result. A drive system for this machine has electric motor 20, reduction gearing 22, pullys 24 and 26 connected with belt 28 which in turn feeds power to reduction gear train 30 which also changes the direction of rotation. With these reduction means the bushing 32 may rotate as low as two or three revolutions per minute. This drive system is shown for illustration purposes only as various other known means may be used to obtain the desired speed of rotation. An arbor or mandrel 34, which is driven by the power means, extends vertically and is normal to a platform or working surface 36 which is fastened with a press fit to the arbor so that the platform and arbor rotate together. The arbor is threaded at 38 to accept a fastener. A shaper tool 40 is adjustably mounted with pivotable arms 42 and 44 and has a contoured edge 46 which determines the outside contour 48 of a planter 50.

Figure 2:
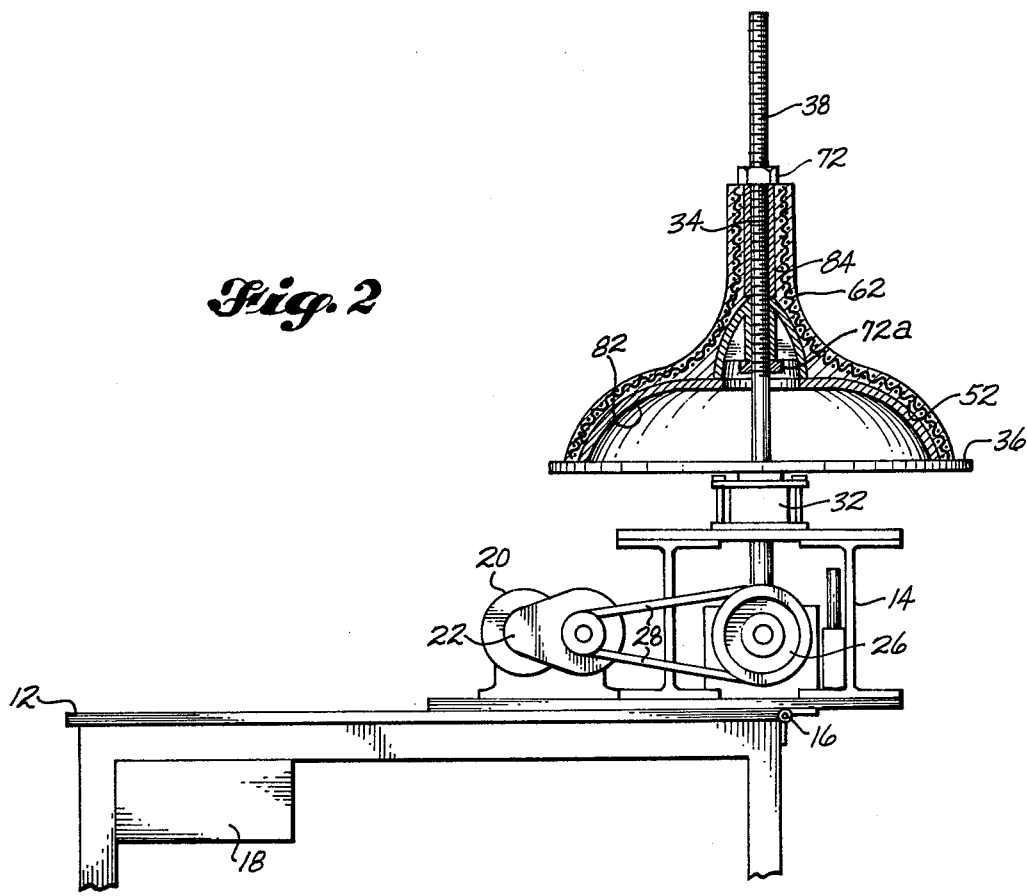
FIG. 2 shows a fragmented side elevational view of the machine with a sectional view of a preliminary portion of the planter of FIG. 1 mounted to the machine.
Figure 3:
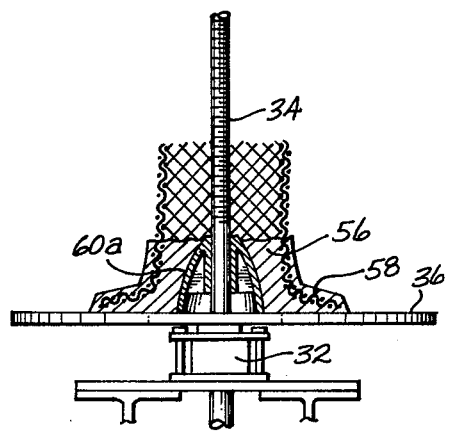
FIG. 3 shows a fragmented side elevational view of an interior part of a sectioned foot member for a planter.
Figure 4:
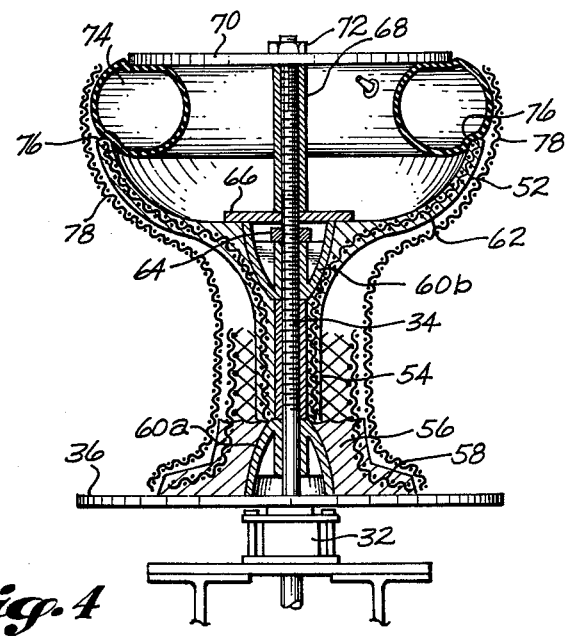
FIG. 4 shows a fragmented side elevational view, in section, of the interior part of the planter of FIG. 1 assembled and ready to be formed into the finished planter.
Figure 5:
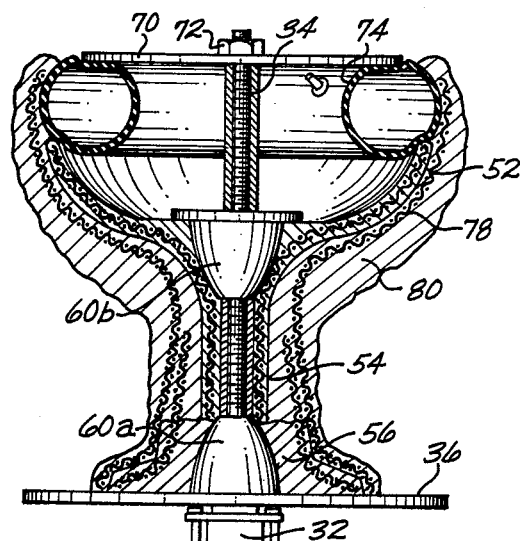
FIG. 5 shows the view of FIG. 4 with the mortar of the aggregate added.
Figure 6:
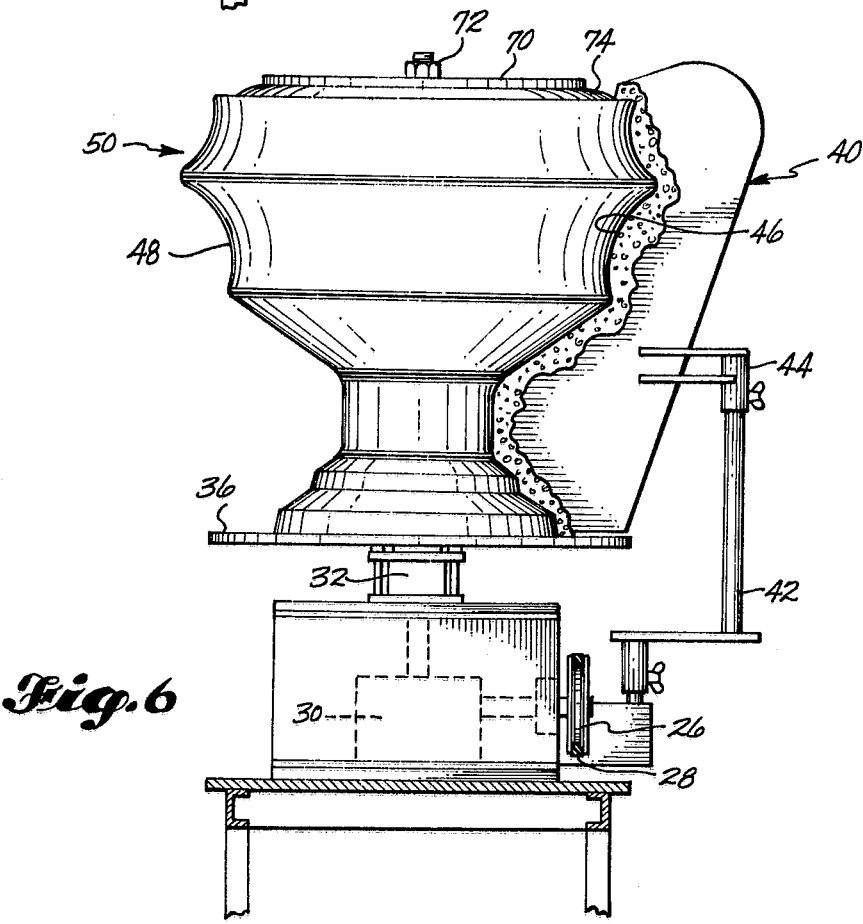
FIG. 6 shows the view of FIG. 5 with a positioned shaper and the planter shaped.

An interior part of the planter made up of an open ended mold 52 which is preferably bowl shaped, neck mold 54 and foot or pedestal mold 56 is first fastened to the arbor. See FIG. 4 where the foot mold with open mesh embedded wire 58 extending out of the mold is centered on the arbor with cone 60a, and the neck and bowl mold with open mesh embedded wire 62 is held in place with cone 60b by nut 64. Plate 66 is held by sleeve 68, plate 70 which is fastened by nut 72. Plate 70 holds inflated inner tube 74 against the end 76 of bowl mold 52. Open mesh wire 78 is fastened to the exterior of each of the interior molds to extend from part way up the inner tube down to the platform. In FIG. 5 an aggregate 80 in the form of a mortar is located on the outside of the interior sections and in FIG. 6 the outside contour 48 is formed from the aggregate by the edge 46 of the shaper 40. The aggregate may be made up of any normal aggregate with small size particles such as to use sand and cement mixed with sufficient water to be handled in a mud or mortar condition. A preferred mix is composed of 2 parts permilite, which is a light weight substitute for the sand, 1 part cement and 1 part lime mixed together then mixed with water to the proper consistency. The interior parts of the planter may be made up at the same time the planter is being formed or the individual interior parts are made up on the machine as shown in FIGS. 2 and 3. In FIG. 2 the bowl portion of the mold 52 and the neck portion of the mold 54 are both formed in one step as a single piece. A male type forming mold 82 and a mold sleeve 84 are centered on arbor 34 with cone 60a which is then fastened with nuts 72 and 72a. An open mesh wire 62 is fastened to the outside of the mold, the arbor 34 rotated and an aggregate in the form of mortar placed around the exterior to form the bowl and neck or collar portion of the interior mold. After the aggregate sets up the male mold 82 is removed and the collar mold 84 may or may not be removed. The foot portion 56 of the interior part of the planter is also centered on the platform and arbor, see FIG. 3. The interior molded parts of the planter may also be formed in a stationary mold, allowed to cure, stored, and later placed on the platform and arbor in an assembly for for forming the finished planter. The bowl portion and the neck portion may be formed separately. FIG. 7 shows the planter 50, with the carriage 14 rotated to place the arbor with held planter in the horizontal position and the arbor is rotated while rocks 86 are impelled against the partially cured aggregate to leave the rocks adhering to while mostly extending outside the surface of the aggregate.

To form a planter the bowl 52, neck 54 and foot 56 interior members are preformed then fastened in position on the arbor 34 as an assembly. The inflated inner tube 74 is then placed on top of the lip of the bowl and fastened into position on the arbor. Open mesh wire 78 is then placed around the inner tube and the interior member assembly and the platform 36 with members mounted to the arbor is rotated with shaper 40 mounted with respect to the axis of the arbor to remove excess aggregate 80; which is placed to shape the planter to its final outside contour. Next the machine is rotated 90 degrees to a horizontal position, the shaper tool removed and a plurality of rocks 86 impelled against the rotating planter. Alternately the aggregate may be placed on the interior mold assembly and the planter shaped with the arbor in the horizontal position. Thus, both the forming and the placement of rocks take place with the arbor in the horizontal position. A single color, or alternately a combination of different colored rocks, are randomly applied to adhere to and extend out from the contoured aggregate when practicing this invention. The use of an inner tube for the top part of the mold permits making a planter which has a smaller diameter at the lip 88 of the planter than an adjacent diameter as the inner tube is deflated and removed.

Figure 10:
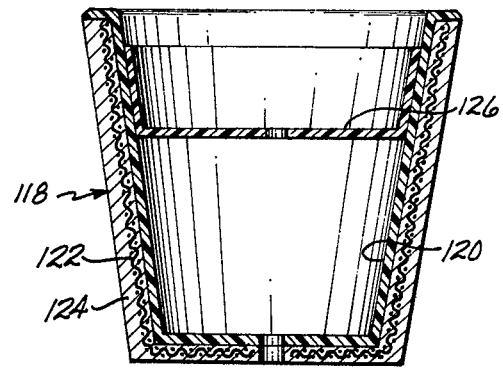
FIG. 10 shows a fragmented side elevation, in section, of yet another embodiment of a planter having an insert.

FIGS. 8, 9 and 10 show different embodiments of a planter formed around a plastic container which is left in the finished planter. FIG. 8 shows a contoured urn shaped planter 90 situated on platform 36, fastened to arbor or mandrel 34, and with stationary shaper tool 40 a with edge 46a for shaping and smoothing the outside contour 92 of the planter. In this embodiment an open ended plastic container 94 is inverted then centered on the arbor. A molded neck or collar 96 is then placed above the inverted container and next an open ended plastic container 98 is centered on the arbor above the molded collar. These interior parts are fastened to the arbor with spacers 100a and 100b and nut 102. Open mesh wire 104 is fastened around the interior assembly, the whole exterior covered with an aggregate in the mortar or mud condition the unit rotated and the planter shaped. When the planter is partially cured, the shaping tool is removed and small rocks are impelled against the sides of the rotating planter to build up on the sides with the rocks sticking out.

The embodiment of FIG. 9 is formed with an open ended plastic container 106 and an inverted open ended plastic container 108 foot piece abutting each other. This planter 110 has open mesh wire 112 extending from underneath the laterally extending lip 114 of container 106 to the platform 36 and aggregate 116.

The embodiment of FIG. 10 is a vase shaped planter 118 made up of interior mold 120, open wire mesh 122 and aggregate 124. This planter also has plastic insert 126 which may be placed in the planter.

I claim:

1. A machine for forming a planter comprising: a platform; an arbor extending through and connected to the platform; means on said arbor and said platform for fastening a work piece, making up parts of a planter, to the platform and arbor; a drive system means for rotating the arbor and platform with work piece at a few revolutions per minute; and means for adjustably positioning a shaper tool with respect to the work piece, said tool to remain stationary as the platform arbor and work piece rotate to shape the outside contour of the planter.

2. A machine as in claim 1 further comprising: means for fastening the work piece to the arbor at various heights above the platform.

3. A machine for forming a planter as in claim 1 further comprising means for fastening an inflatable innertube to the end of the arbor prior to forming the planter to permit forming a lip on the planter having a diameter smaller than an adjacent diameter.

4. A machine for forming a planter as in claim 1 further comprising the arbor and drive system mounted to a carriage, and said carriage pivotally mounted to a base to permit operation with the arbor in a vertical of a horizontal position.

5. An apparatus for forming planters comprising: a base; a carriage; a machine mounted to the carriage, said machine comprising an arbor that extends vertically through and normal to a platform with said arbor fastened to the platform and having means for adjustably fastening a work piece onto the platform, a drive system to rotate the platform with arbor at a few revolutions per minute, and a shaper tool adjustably positioned with respect to the arbor to remain stationary and shape the work piece into a planter; and the carriage is pivotally mounted to the base in a manner to permit operating with the arbor of the machine in a vertical or a horizontal position.

6. An apparatus for forming planters as in claim 5 further comprising means for fastening an inflatable innertube on the arbor prior to forming the planter to permit forming a lip on the planter having a diameter smaller than an adjacent diameter.

* * * * *